(12) United States Patent
Choi

(10) Patent No.: US 10,876,489 B2
(45) Date of Patent: Dec. 29, 2020

(54) METHOD AND SYSTEM OF CORRECTING FUEL INJECTION QUANTITY OF VEHICLE

(71) Applicants: Hyundai Motor Company, Seoul (KR); Kia Motors Corporation, Seoul (KR)

(72) Inventor: Mu Young Choi, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/589,904

(22) Filed: Oct. 1, 2019

(65) Prior Publication Data
US 2020/0340419 A1 Oct. 29, 2020

(30) Foreign Application Priority Data
Apr. 23, 2019 (KR) ........................ 10-2019-0047573

(51) Int. Cl.
*F02D 41/26* (2006.01)
*F02D 41/24* (2006.01)
*F02D 41/04* (2006.01)
*F02D 41/30* (2006.01)
*F02D 1/00* (2006.01)

(52) U.S. Cl.
CPC ............ *F02D 41/248* (2013.01); *F02D 41/04* (2013.01); *F02D 41/3005* (2013.01); *F02D 2001/0085* (2013.01)

(58) Field of Classification Search
CPC .... F02D 41/248; F02D 41/04; F02D 41/3005; F02D 2001/0085
USPC ............... 123/672, 673, 685, 691, 692, 697; 701/103–105, 113; 60/276, 284
See application file for complete search history.

(56) References Cited

U.S. PATENT DOCUMENTS 10,626,768 B2 * 4/2020 Tanaka ................... F01N 11/007
123/3
2020/0049043 A1 * 2/2020 Nose et al. ............. F02D 41/30
123/685

FOREIGN PATENT DOCUMENTS

KR 100634597 B1 10/2006

* cited by examiner

Primary Examiner — Hai H Huynh
(74) Attorney, Agent, or Firm — Mintz Levin Cohn Ferris Glovsky and Popeo, P.C.; Peter F. Corless

(57) ABSTRACT

A method of correcting a fuel injection quantity of a vehicle corrects the fuel injection quantity prior to activation of a lambda sensor when an engine is turned on. Additionally, the method increases a speed for activating a catalyst to reduce a harmful substance in exhaust gas at the beginning of engine starting.

13 Claims, 3 Drawing Sheets

METHOD AND SYSTEM OF CORRECTING FUEL INJECTION QUANTITY OF VEHICLE

CROSS REFERENCE TO RELATED APPLICATION

The present application claims priority to Korean Patent Application No. 10-2019-0047573, filed on Apr. 23, 2019, the entire contents of which is incorporated herein for all purposes by this reference.

BACKGROUND

1. Technical Field

The present disclosure relates to a method and system of correcting a fuel injection quantity of a vehicle, for learning and correcting the fuel injection quantity when an engine is turned on and reducing emission of harmful gas via rapid activation of a catalyst.

2. Description of the Related Art

An internal combustion engine as well as a gasoline engine used in a vehicle generates exhaust gas during fuel combustion to generate engine power, and the exhaust gas includes nitrogen oxide and harmful substances such as carbon monoxide or hydrocarbon due to incomplete combustion. To reduce harmful substances in the exhaust gas, a catalyst is provided in a vehicle, and for a rare catalyst material, oxygen is adsorbed, and when there is an abundant catalyst material, oxygen is emitted, and thus a theoretical air-fuel ratio is maintained to sustain performance of a catalyst.

Additionally, to reduce harmful substances according to environmental regulations, lambda control is activated to adjust a fuel injection quantity. However, when harmful substance are generated after starting an engine, exhaust gas emitted from an engine is not purified before a catalyst reaches an activation temperature after starting due to the characteristics of the catalyst. A lambda sensor is activated from 10 to 15 seconds after starting to begin feedback, and when the lambda sensor is not activated, the adjustment of a fuel injection quantity is performed based on a previous learned value, and accordingly exhaust gas is increased at the beginning of starting.

In other words, in general, logic of maintaining a theoretical air-fuel ratio via learning of an air-fuel ratio is applied to a gasoline engine, and in this regard such a learned value may be inappropriate for a condition after starting. Since a coolant temperature, engine revolutions per minute (RPM), ignition timing, and driving of a cam at the beginning of starting are special driving conditions that are momentarily applied after starting at low temperature, as a learned value of a situation in which a vehicle is generally driven is applied, exhaust gas is increased.

The contents described as the related art have been provided merely to assist in understanding the background of the present disclosure and should not be considered as corresponding to the related art known to those having ordinary skill in the art.

SUMMARY

An object of the present disclosure is to provide a method and system of correcting a fuel injection quantity of a vehicle, for correcting a learned value applied before a lambda sensor is activated after engine starting to reduce emission of harmful substances in exhaust gas.

According to an exemplary embodiment of the present disclosure, a method of correcting a fuel injection quantity of a vehicle may include checking entrance into a catalyst heating period after the vehicle is turned on; correcting a fuel injection quantity to a pre-learned correction value during entrance into the catalyst heating period; detecting whether a current lambda value corresponds to a target lambda value when a lambda sensor is activated after the vehicle is turned; and storing the correction value without change when a difference between the current lambda value and the target lambda value is within a preset lambda allowable range and adjusting the correction value based on the difference between the current lambda value and the target lambda value when the difference between the current lambda value and the target lambda value is beyond the preset lambda allowable range.

The storing and adjusting of the correction value may include detecting whether an engine revolutions per minute (RPM) reaches a preset setting RPM when the difference between the current lambda value and the target lambda value is within the preset lambda allowable range, and storing the correction value without change when the engine RPM reaches the preset setting RPM. Additionally, the storing and adjust of the correction value may include deriving a fuel injection quantity by which the difference between the current lambda value and the target lambda value is within the preset lambda allowable range after the lambda sensor is activated when the difference between the current lambda value and the target lambda value is beyond the preset lambda allowable range, adjusting the correction value using the derived fuel injection quantity, and correcting the fuel injection quantity using the adjusted correction value when the correction value is adjusted.

The checking of entrance into a catalyst heating period after the vehicle is turned on may further include detecting whether a gear stage is a neutral (N) or drive (D) stage during entrance into the catalyst heating period, and the correction value may be classified into an N-stage correction value based on an N stage and a D-stage correction value based on a D stage. Accordingly, the fuel correction operation may include correcting the fuel injection quantity using the N-stage correction value when a gear stage is the N stage and correcting the fuel injection quantity using the D-stage correction value when the gear stage is the D stage.

Additionally, the method may further include correcting the fuel injection quantity using a preset general learning value when a driving condition is outside the catalyst heating period and determining a difference between the general learning value and the correction value. The correction value may be stored without change when the difference between the general learning value and the correction value is within a preset learning allowable range.

The method may further include determining whether an engine RPM reaches a preset setting RPM when a difference between the general learning value and the correction value is beyond a preset learning allowable range, and storing the correction value without change when the engine RPM reaches the setting RPM. The correction value may be adjusted using an average of the general learning value, when the engine RPM does not reach the setting RPM in a state in which the difference between the general learning value, and is beyond the preset learning allowable range.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, a method of correcting a fuel injection quantity of a vehicle will be described with regard to exemplary embodiments of the present disclosure with reference to the attached drawings.

Figure 1:
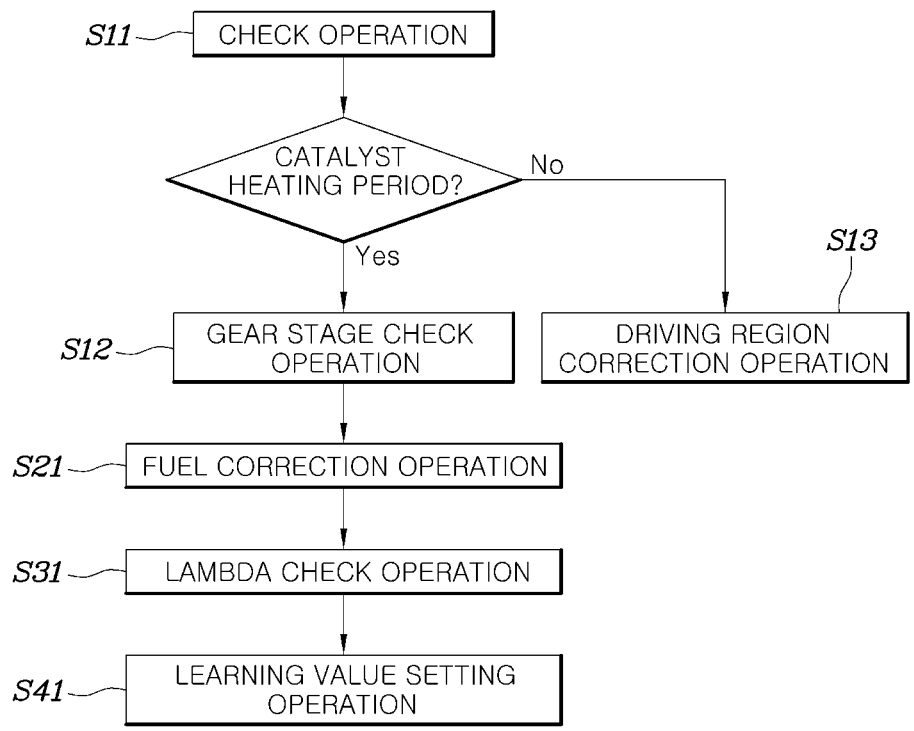
FIG. 1 is a flowchart of a method of correcting a fuel injection quantity of a vehicle according to an exemplary embodiment of the present disclosure.
Figure 2:
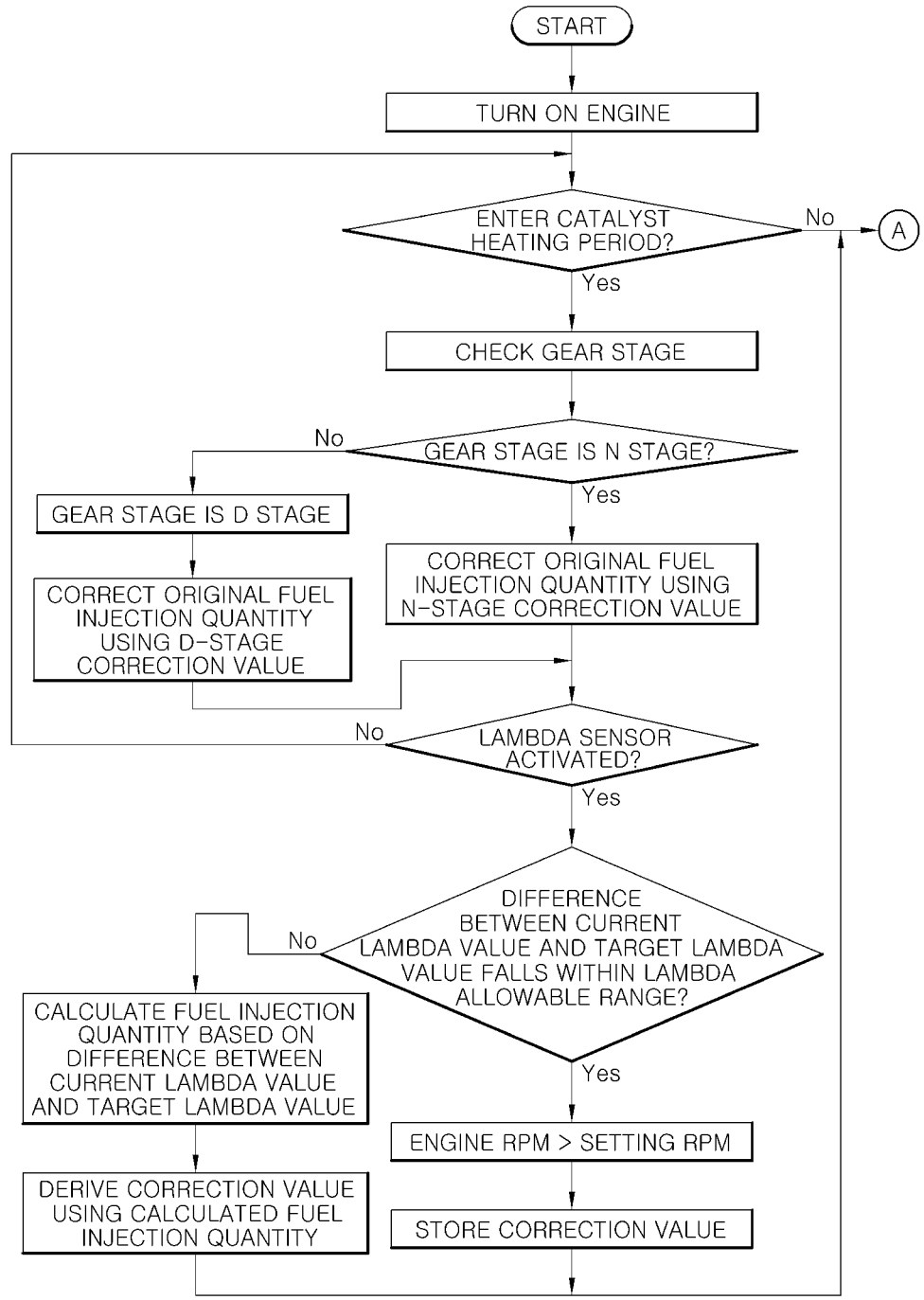
FIGS. 2 and 3 are detailed flowcharts of the method of correcting a fuel injection quantity of a vehicle shown in FIG. 1 according to an exemplary embodiment of the present disclosure.
Figure 3:
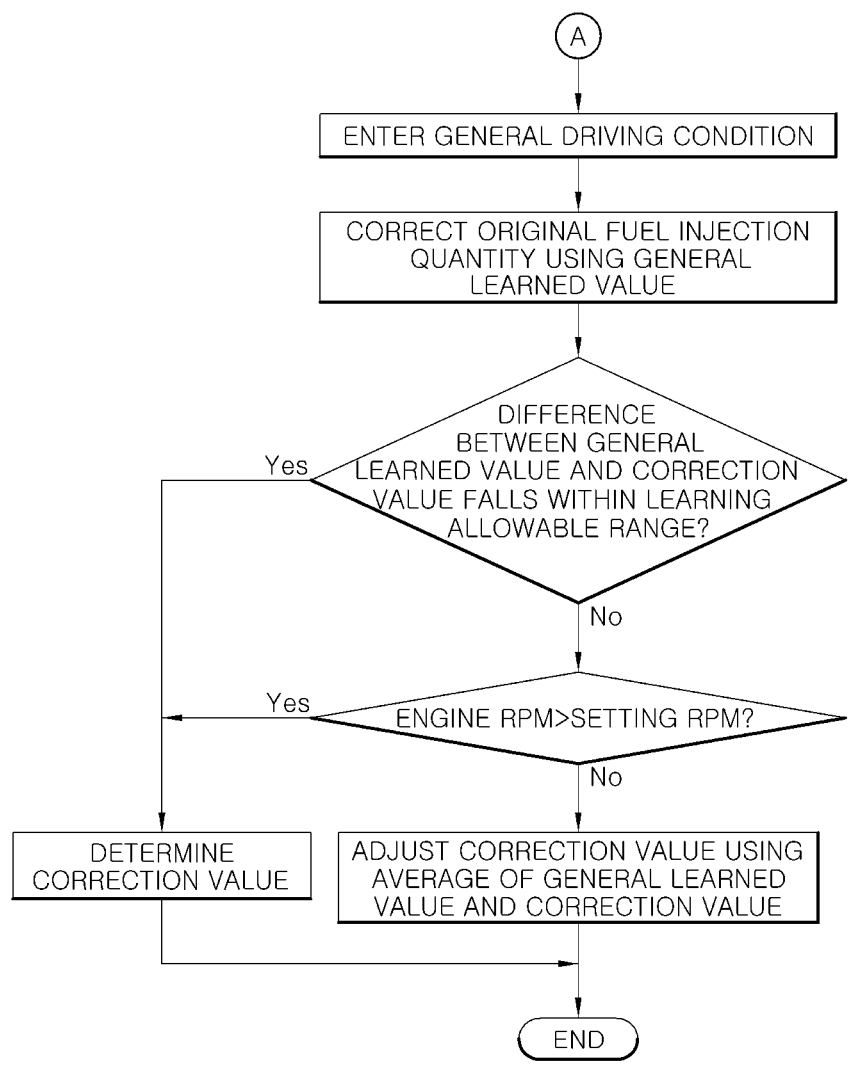

As shown in FIGS. 1 to 3, the method of correcting a fuel injection quantity of a vehicle according to the present disclosure may include a check operation S11 of detecting entrance into a catalyst heating period after a vehicle is turned on; a fuel correction operation S21 of correcting a fuel injection quantity to a pre-learned correction value in response to detecting entrance into the catalyst heating period; a lambda check operation S31 of detecting whether a current lambda value corresponds to a target lambda value when a lambda sensor is activated after the vehicle is turned on; and a learning value setting operation S41 of storing the correction value without change when a difference between the current lambda value and the target lambda value is within a preset lambda allowable range and adjusting the correction value based on the difference between the current lambda value and the target lambda value when the difference between the current lambda value and the target lambda value is beyond the preset lambda allowable range.

The method of correcting a fuel injection quantity according to the present disclosure may be performed by a controller and may use a catalyst temperature sensor configured to detect a temperature of a catalyst and a lambda sensor provided before and after the catalyst and configured to detect an air-fuel ratio. Particularly, the controller may be embodied using a non-volatile memory (not shown) configured to store data about an algorithm configured to control operations of various components of a vehicle or data about a software command for reproducing the algorithm, and a processor (not shown) configured to perform the following operations using the data stored in the corresponding memory. The memory and the processor may be embodied in separate chips.

Alternatively, the memory and the processor may be embodied in a single integrated chip. The processor may be configured in the form of one or more processors. The controller may be configured to collect various pieces of driving information regarding the vehicle and information from components added to a catalyst device and may be configured to correct a learned value for adjusting the fuel injection quantity according to the present disclosure.

The present disclosure may be provided to reduce a harmful substance in exhaust gas immediately after an engine of a vehicle is turned on, and first, through the check operation S11, entrance into the catalyst heating period after the vehicle is turned on may be detected, and through the fuel correction operation S21, in response to detecting entrance into the catalyst heating period, the fuel injection quantity may be corrected to a pre-learned correction value. In particular, the correction value may be an optimum fuel injection quantity for reducing a harmful substance in exhaust gas immediately after the lambda sensor is previously activated and may be a fuel injection quantity that is corrected based on the fuel injection quantity after the catalyst is activated.

Accordingly, in the catalyst heating period, immediately after the vehicle is turned on, as the fuel injection quantity is corrected to the pre-learned correction value before the lambda sensor is activated, a harmful substance in exhaust gas emitted during a short time immediately after the vehicle is turned on may be reduced. When the lambda sensor is activated as a predetermined time elapses after the vehicle is turned on, the check operation S11 and the fuel correction operation S21 may be completed based on the catalyst heating period, and the lambda check operation S31 may be performed to detect whether the current lambda value corresponds the target lambda value.

In other words, the lambda sensor may be affected by exhaust gas to be activated after the engine is turned on, the fuel injection quantity may be corrected to the pre-learned correction value to reduce a harmful substance before the lambda sensor is activated, and whether the current lambda value corresponds the target lambda value may be detected after the lambda sensor is activated. Accordingly, the fuel injection quantity may be corrected to the optimum fuel injection quantity for reducing a harmful substance. When the difference between the current lambda value and the target lambda value is within the preset lambda allowable range, a harmful substance may be already reduced before the lambda sensor is activated, and accordingly the correction value may be stored without change.

When the difference between the current lambda value and the target lambda value is beyond the preset lambda allowable range, a harmful substance may not be sufficiently reduced, and thus correction value may be corrected based on the difference between the current lambda value and the target lambda value. Accordingly, the fuel injection quantity may be corrected to the adjusted correction value when the vehicle is turned on again to reduce a harmful substance in exhaust gas. Particularly, the correction value may be calculated by subtracting the original fuel injection quantity from a fuel injection quantity to which the previous correction value is applied and then dividing the result with the original fuel injection quantity.

In other words, conventionally, a learned value of a fuel injection quantity for maintaining a theoretical air-fuel ratio may be set in a period in which both a catalyst and a lambda sensor of the vehicle are activated and may be inappropriate to be applied at the beginning of starting the engine. According to the present disclosure, the correction value may be adjusted based on the preset target lambda value and the current lambda value measured for a short driving time after the lambda sensor is activated, and an optimum fuel injection quantity for reducing a harmful substance at the beginning of starting may be derived.

According to the present disclosure, a fuel injection quantity before the lambda sensor is activated when the engine is turned on may be corrected to increase a speed for activating a catalyst and to reduce a harmful substance in exhaust gas, and the correction value may be adjusted based on a lambda value immediately after the lambda sensor is activated. Therefore, an optimum fuel injection quantity for reducing a harmful substance in exhaust gas after the engine is turned on may be derived.

The aforementioned present disclosure will now be described in detail. In the learning value setting operation S41, when the difference between the current lambda value and the target lambda value is within the preset lambda allowable range, whether an engine revolutions per minute (RPM) reaches a preset setting RPM may be detected. When the engine RPM reaches the preset setting RPM, the correction value may be stored without change. Accordingly, when the difference between the current lambda value and the target lambda value is within the lambda allowable range, and whether the engine RPM reaches the preset setting RPM may be determined to enhance control reliability.

Particularly, the setting RPM may be set as if the engine RPM corresponds to rotation of about 20 cycles, and this value may be capable of being tuned according to a vehicle type or characteristics. In other words, when the difference between the current lambda value and the target lambda value is within the lambda allowable range, if the engine RPM does not reach the setting RPM, determination may be delayed until the engine RPM reaches the setting RPM. Thus determination reliability of when the difference between the current lambda value and the target lambda value is within the lambda allowable range may be ensured.

In the learning value setting operation S41, when the difference between the current lambda value and the target lambda value is beyond the preset lambda allowable range, a fuel injection quantity by which the difference between the current lambda value and the target lambda value is within the preset lambda allowable range after the lambda sensor is activated may be derived, and the correction value may be adjusted using the derived fuel injection quantity. In other words, when there is a difference between the current lambda value and the target lambda value, a harmful substance in exhaust gas may not be reduced, and thus, feedback control may be executed to adjust the difference between the current lambda value and the target lambda value to be within the lambda allowable range by adjusting the fuel injection quantity.

Through such feedback control, in the learning value setting operation S41, when the fuel injection quantity by which the difference between the current lambda value and the target lambda value is within the lambda allowable range is derived, the correction value may be adjusted using the derived fuel injection quantity and the fuel injection quantity may be corrected to the adjusted correction value, and thus since the fuel injection quantity may be corrected to the corresponding correction value when the engine is turned on in the future, a harmful substance in exhaust gas may be reduced.

The check operation S11 may further include a gear stage check operation S12 of detecting whether a gear stage is a neutral (N) or a drive (D) stage in response to detecting entrance into the catalyst heating period. In the gear stage check operation S12, an operation based on manipulation of a change lever may be sensed to determine whether a gear stage is selected as an N or D stage. In particular, the correction value may be an N-stage correction value based on an N stage and a D-stage correction value based on a D stage. Substantially, RPM of the vehicle according to N and D stages may be set differently via engine control. In other words, engine control may be performed in which RPM in the N stage and RPM in the D stage are different and RPM in the D stage may be decreased and then the RPM may be increased when driving begins.

Particularly, a gear stage is an N stage at the beginning of starting the engine, but as RPM is changed when the N stage is immediately changed to the D stage, the correction value may be classified into the N-stage correction value based on an N stage and the D-stage correction value based on a D stage. The N-stage correction value and the D-stage correction value may be adjusted based on the aforementioned difference between the current lambda value and the target lambda value, and the correction value of the fuel injection quantity may be changed based on the N or D stage. Accordingly, the fuel injection quantity may be corrected to the optimum fuel injection quantity according to each gear stage.

The check operation S11 may further include a driving region correction operation S13 of correcting the fuel injection quantity using a preset general learning value during a driving condition outside the catalyst heating period. In other words, in the driving region correction operation S13, the vehicle may enter a normal general driving condition outside the catalyst heating period when a catalyst receives heat through exhaust gas and is activated. Accordingly, when the vehicle is outside the catalyst heating period, the fuel injection quantity may be corrected to the preset general learning value, and thus a fuel may be injected with a fuel injection quantity appropriate for a state in which a catalyst is activated.

In particular, in the driving region correction operation S13, a difference between a general learning value and a correction value may be determined, and when the difference between the general learning value and the correction value is within a preset learning allowable range, the correction value may be stored without change. In other words, with regard to the general learning value, in a state in which the catalyst and the lambda sensor are activated, a fuel injection quantity by which a harmful substance in exhaust gas is reduced may be determined. Thus, when the difference between the correction value and the general learning value is within the preset learning allowable range, the correction value may be stored without change. Accordingly, the fuel injection quantity may be corrected to the correction value in response to detecting an entrance into the catalyst heating period when the vehicle is turned on in the future.

In the driving region correction operation S13, when the difference between the general learning value and the correction value is beyond the preset learning allowable range, whether the engine RPM reaches a preset setting RPM may be detected. When the engine RPM reaches the setting RPM, the correction value may be stored without change. Therefore, whether the engine RPM reaches the preset setting RPM may be detected, and thus reliability of checking whether the difference between the general learning value and the correction value reaches the learning allowable range may be enhanced. In other words, when the engine RPM reaches the setting RPM, as the time taken to drive the correction value and the general learning value is ensured, the reliability may be enhanced. Particularly, the setting RPM may be set about 20 cycles of the engine RPM, and this value may be capable of being tuned according to a vehicle type or vehicle characteristics.

In the driving region correction operation S13, when the engine RPM does not reach the setting RPM when the difference between the general learning value and the correction value is beyond the preset learning allowable range, the correction value may be adjusted using an average of the general learning value and the correction value. In other words, when the engine RPM does not reach the setting RPM, reliability for the correction value and the general learning value may be insufficient, and thus the correction value may be adjusted using the average of the general learning value and the correction value. Therefore, correction may be performed based on the difference between the general learning value and the correction value. Accordingly, the reliability based on the engine RPM may be detected, and when the reliability is insufficient, the correction value may be adjusted using the average of the general learning value and the correction value, and thus it may be possible to derive the fuel injection quantity based on the correction value for reducing a harmful substance in exhaust gas.

The method of correcting a fuel injection quantity of a vehicle configured as described above may correct a learned value in the catalyst heating period after the engine is turned on and the fuel injection quantity may be adjusted using the corrected learned value, and thus a speed for activating a catalyst may be enhanced, and accordingly a harmful substance in exhaust gas may be reduced at the beginning of engine starting.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A method of correcting a fuel injection quantity of a vehicle, comprising:
   detecting, by a controller, an entrance into a catalyst heating period after the vehicle is turned on;
   correcting, by the controller, a fuel injection quantity to a pre-learned correction value in response to detecting the entrance into the catalyst heating period;
   detecting, by the controller, whether a current lambda value corresponds a target lambda value when a lambda sensor is activated after the vehicle is turned on; and
   storing, by the controller, the correction value without change when a difference between the current lambda value and the target lambda value is within a preset lambda allowable range and adjusting the correction value based on the difference between the current lambda value and the target lambda value when the difference between the current lambda value and the target lambda value is beyond the preset lambda allowable range.

2. The method of claim 1, further comprising:
   detecting, by the controller, whether an engine revolutions per minute (RPM) reaches a preset setting RPM when the difference between the current lambda value and the target lambda value is within the preset lambda allowable range; and
   storing, by the controller, the correction value without change when the engine RPM reaches the preset setting RPM.

3. The method of claim 1, further comprising:
   deriving, by the controller, a fuel injection quantity by which the difference between the current lambda value and the target lambda value falls within the preset lambda allowable range after the lambda sensor is activated when the difference between the current lambda value and the target lambda value is beyond the preset lambda allowable range; and
   adjusting, by the controller, the correction value using the derived fuel injection quantity.

4. The method of claim 3, further comprising:
   correcting, by the controller, the fuel injection quantity using the adjusted correction value when the correction value is adjusted.

5. The method of claim 1, further comprising:
   detecting, by the controller, whether a gear stage is a neutral (N) or a drive (D) stage in response to detecting the entrance into the catalyst heating period;
   wherein the correction value is classified into an N-stage correction value based on an N stage and a D-stage correction value based on a D stage.

6. The method of claim 5, further comprising:
   correcting, by the controller, the fuel injection quantity using the N-stage correction value when a gear stage is the N stage; and
   correcting, by the controller, the fuel injection quantity using the D-stage correction value when the gear stage is the D stage.

7. The method of claim 1, further comprising:
   correcting, by the controller, the fuel injection quantity using a preset general learning value when a driving condition is outside the catalyst heating period;
   determining, by the controller, a difference between the general learning value and the correction value; and
   storing, by the controller, the correction value without change when the difference between the general learning value and the correction value is within a preset learning allowable range.

8. The method of claim 7, further comprising:
  detecting, by the controller, whether an engine revolutions per minute (RPM) reaches a preset setting RPM when a difference between the general learning value and the correction value is beyond a preset learning allowable range; and
  storing, by the controller, the correction value without change when the engine RPM reaches the setting RPM.

9. The method of claim 8, further comprising:
  adjusting, by the controller, the correction value using an average of the general learning value and the correction value when the engine RPM does not reach the setting RPM when the difference between the general learning value and the correction value is beyond the preset learning allowable range.

10. A system of correcting a fuel injection quantity of a vehicle, comprising:
  a memory configured to store program instructions; and
  a processor configured to execute the program instructions, the program instructions when executed configured to:
    detect an entrance into a catalyst heating period after the vehicle is turned on;
    correct a fuel injection quantity to a pre-learned correction value in response to detecting the entrance into the catalyst heating period;
    detect whether a current lambda value corresponds a target lambda value when a lambda sensor is activated after the vehicle is turned on; and
    store the correction value without change when a difference between the current lambda value and the target lambda value is within a preset lambda allowable range and adjust the correction value based on the difference between the current lambda value and the target lambda value when the difference between the current lambda value and the target lambda value is beyond the preset lambda allowable range.

11. The system of claim 10, wherein the program instructions when executed are further configured to:
  detect whether an engine revolutions per minute (RPM) reaches a preset setting RPM when the difference between the current lambda value and the target lambda value is within the preset lambda allowable range; and
  store the correction value without change when the engine RPM reaches the preset setting RPM.

12. The system of claim 10, wherein the program instructions when executed are further configured to:
  derive a fuel injection quantity by which the difference between the current lambda value and the target lambda value falls within the preset lambda allowable range after the lambda sensor is activated when the difference between the current lambda value and the target lambda value is beyond the preset lambda allowable range; and
  adjust the correction value using the derived fuel injection quantity.

13. The system of claim 12, wherein the program instructions when executed are further configured to:
  correct the fuel injection quantity using the adjusted correction value when the correction value is adjusted.

* * * * *